United States Patent [19]
Menezes

[11] Patent Number: 6,067,556
[45] Date of Patent: May 23, 2000

[54] METHOD AND APPARATUS FOR ADDING FLOATING POINT NUMBERS IN A DATA PROCESSING SYSTEM

[75] Inventor: Karol Menezes, Portland, Oreg.

[73] Assignee: Intel Corporation, Santa Clara, Calif.

[21] Appl. No.: 09/013,117

[22] Filed: Jan. 26, 1998

[51] Int. Cl.$^7$ ............................................. G06F 7/38
[52] U.S. Cl. ............................................. 708/505
[58] Field of Search .................... 708/201, 496, 708/501, 505

[56] References Cited

U.S. PATENT DOCUMENTS

| | | | |
|---|---|---|---|
| 4,953,115 | 8/1990 | Kanoh ................................ | 708/201 |
| 4,999,803 | 3/1991 | Turrini et al. ..................... | 708/505 |
| 5,563,813 | 10/1996 | Chen et al. ....................... | 708/201 |

*Primary Examiner*—Chuong Dinh Ngo
*Attorney, Agent, or Firm*—Blakely, Sokoloff, Taylor & Zafman LLP

[57] ABSTRACT

A method and apparatus for adding floating point numbers. A ones-complement difference between first and second exponents respectively included in first and second floating point values is generated. Depending on whether a sign bit of the ones-complement difference is in a first state or a second state, either a first mantissa included in the first floating point value or a second mantissa included in the second floating point value is shifted. The first and second mantissas are added after one of the first mantissa and the second mantissa has been shifted.

15 Claims, 4 Drawing Sheets

METHOD AND APPARATUS FOR ADDING FLOATING POINT NUMBERS IN A DATA PROCESSING SYSTEM

FIELD OF THE INVENTION

The present invention relates to the field of data processing, and more particularly to a method and apparatus for adding floating point numbers.

BACKGROUND OF THE INVENTION

Many computer systems include processors having specialized arithmetic circuitry to operate on floating point numbers. Specialized circuitry is required because, unlike fixed-point numbers, floating point numbers have two components: a fractional or normalized component called a mantissa, and an exponent. Before two floating point numbers can be added or subtracted, the mantissas must be adjusted to account for the difference between the exponents.

FIG. 1 is a diagram of a prior-art circuit 5 for adding two floating point numbers, FPN1 and FPN2. Each of the floating point numbers FPN1 and FPN2 includes an exponent, a mantissa and a sign bit (not shown) which represent a numeric value as follows:

$$\text{value} = 2^{(exponent-implied\ offset)} \times (1+\text{mantissa}) \times (-1)^{sign\ bit}.$$

The circuit 5 subtracts the exponents of FPN1 and FPN2 from one another in respective subtraction circuits 6 and 7. The positive difference between the exponents is then selected to indicate the number of bits by which the mantissa of the floating point number having the smaller exponent is to be right-shifted. Because the exponent indicates a power of two by which the mantissa is multiplied, right shifting the mantissa of a floating point number effectively increments its exponent. Consequently, right-shifting a mantissa by a number of bits equal to the positive difference between exponents effectively equalizes the exponents of the two floating point numbers FPN1 and FPN2. Note that the implied offsets in exponents EXP1 and EXP2 cancel one another when the exponents are subtracted.

After one of the mantissas has been right-shifted, it is added to the unshifted mantissa to produce a sum of mantissas. The sum of mantissas and the larger of the exponents are then output as a floating point sum of the numbers FPN1 and FPN2. The floating point sum may be normalized by later circuit stages.

One disadvantage of the prior art circuit 5 is that two separate subtraction operations are performed to obtain a positive difference between exponents. Each subtraction operation requires implementation logic which increases the overall transistor count required to implement the circuit 5. When implemented in an integrated circuit, increased transistor count translates to increased power consumption, circuit die size and fabrication cost.

SUMMARY OF THE INVENTION

A method and apparatus for adding floating point numbers are disclosed. A ones-complement difference between exponents included in first and second floating point values is generated. Depending on whether a sign bit in the ones-complement difference is in a first state or a second state, either a first mantissa included in the first floating point value or a second mantissa included in the second floating point value is shifted. After one of the first and second mantissas has been shifted, the first and second mantissas are added.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to one embodiment of the present invention, floating point addition is accomplished using a significantly reduced number of transistors by generating a ones-complement difference between exponents of respective floating point numbers, then shifting the mantissa of one of the floating point numbers based on the ones-complement difference. If the ones-complement difference is positive, a right-shifted mantissa of one of the floating point numbers is input to a shift element where it is further shifted by a number of bits indicated by the ones-complement difference. If the ones-complement difference is negative, the mantissa of the other one of the floating point numbers is input to the shift element where it is shifted by a number of bits indicated by an inverse of the ones-complement difference. The shifted mantissa is added to the unshifted mantissa to produce a sum of mantissas. One of the exponents of the two floating point numbers is selected based on the ones-complement difference to be the exponent corresponding to the sum of mantissas. Together, the sum of mantissas and the corresponding exponent constitute a floating point sum.

Because, in at least one embodiment, the floating point sum is generated based on a ones-complement difference and not by subtracting exponents from one another in two separate subtraction operations, the circuitry required to perform at least one of the exponent subtraction operations can be eliminated. In the context of an integrated circuit, such as a processor or application-specific integrated circuit (ASIC), eliminated circuitry translates to reduced transistor count and therefore reduced power consumption and reduced die size. Further, because the signal paths by which exponents are delivered to a subtraction circuit typically include multiple conductors, elimination of a subtraction operation simplifies circuit layout and reduces the signal fan-out from the exponent source. This reduced fan-out results in reduced capacitive loading and therefore faster transfer of exponents from a source register to the floating point adder.

Figure 1:
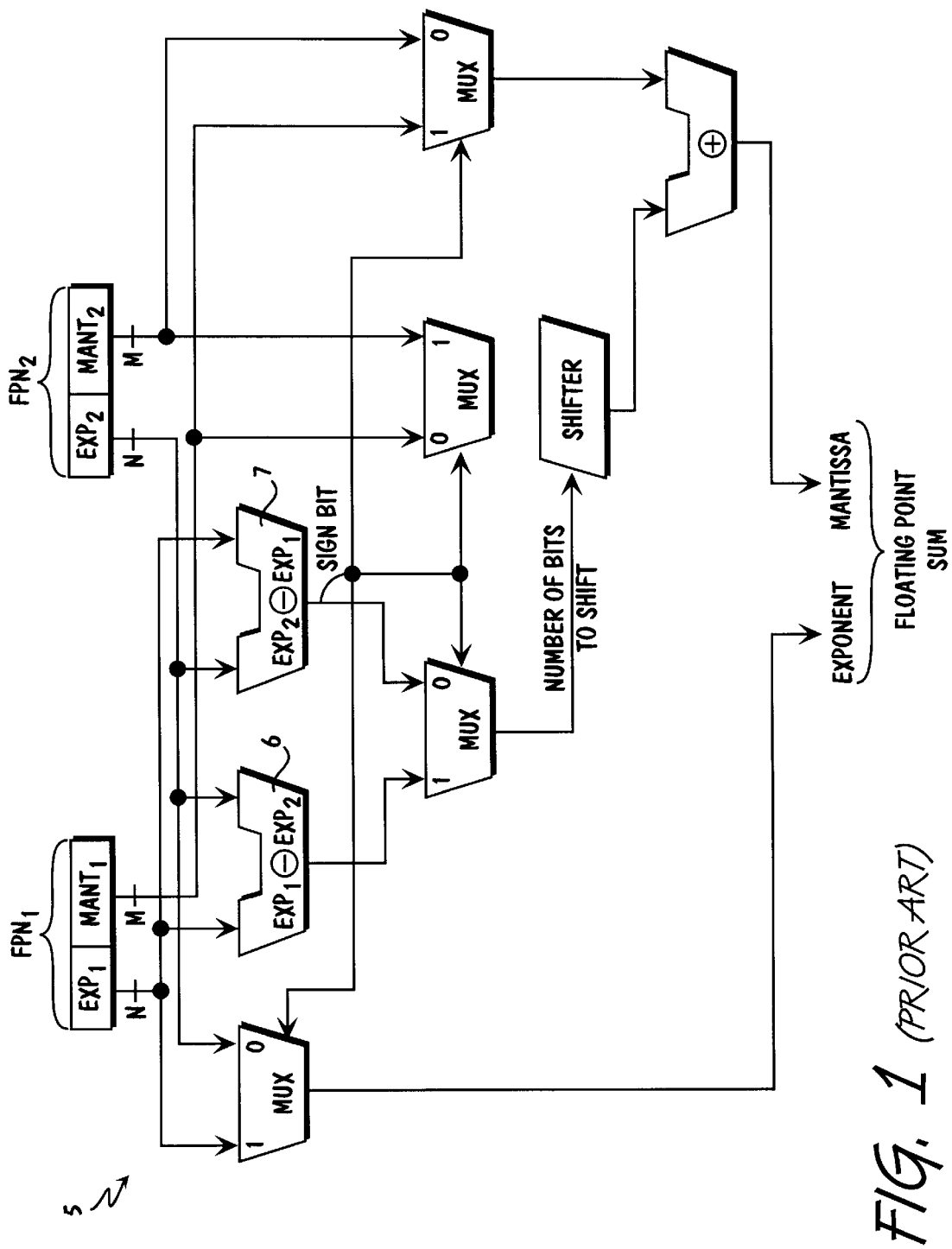
FIG. 1 is a diagram of a prior-art circuit for adding floating point numbers.
Figure 2:
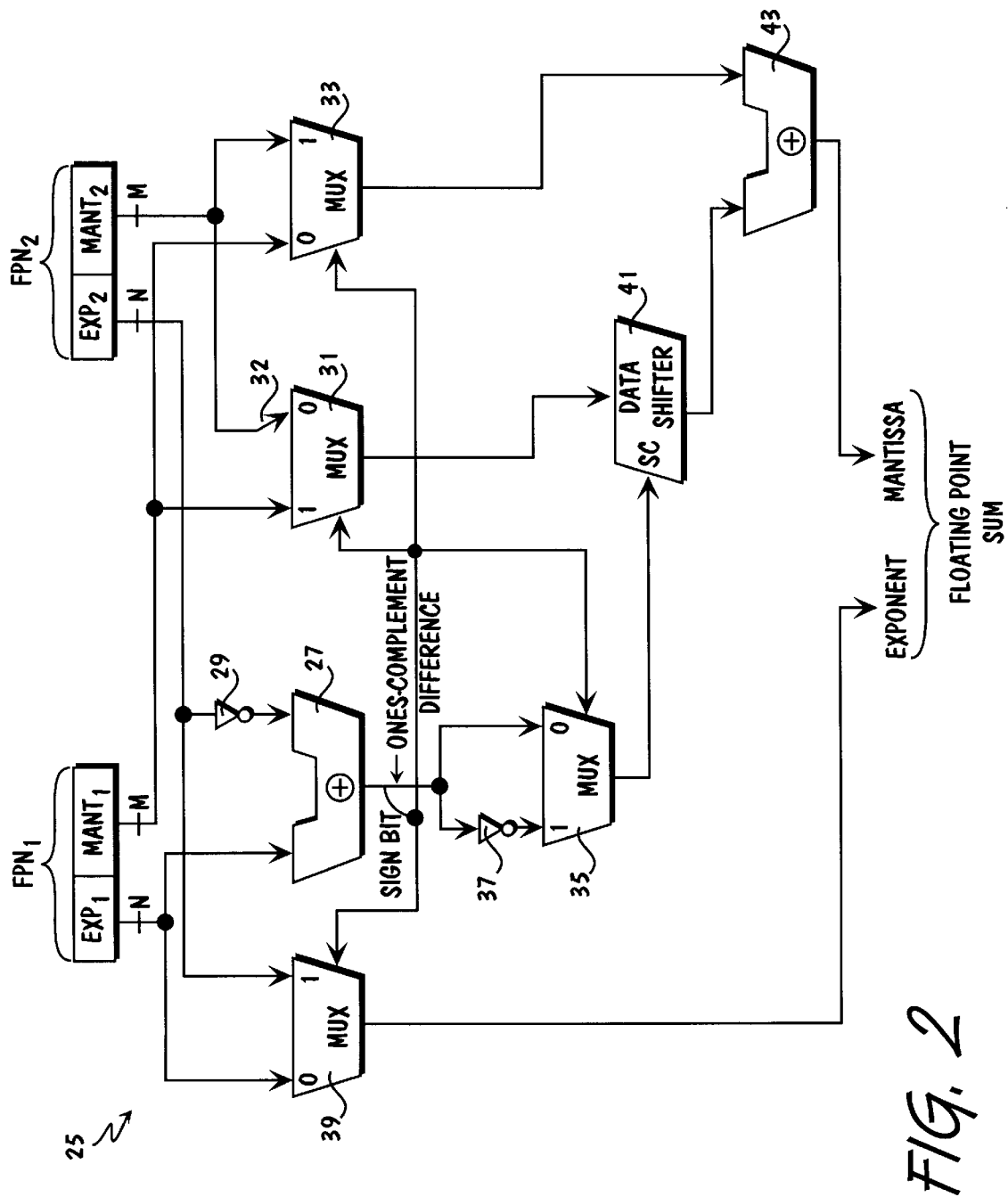
FIG. 2 is a diagram of a floating point adder according to one embodiment of the present invention.

FIG. 2 is a diagram of a floating point adder 25 according to one embodiment of the present invention. Two floating point numbers FPN1 and FPN2 are input to the floating point adder 25. FPN1 and FPN2 each include an N-bit exponent (EXP1 and EXP2, respectively), an M-bit mantissa (MANT1 and MANT2, respectively) and a sign bit (not shown). If the sign bits of the two floating point numbers do not match, then a subtraction operation is required and may be handled by other circuitry (not shown). More specifically, according to one embodiment, if the sign bits of the two floating point numbers do not match, then the numbers are subtracted by a separate subtraction circuit if the exponents are equal to or within one of each other. If the exponents differ by more than one, then the floating point adder 25 may be used to add the numbers despite their sign difference.

The exponent EXP1 is supplied to one input of adding unit 27, and the exponent EXP2 is inverted by inverter 29 and then supplied to the other input of adding unit 27. The output of adding unit 27 is therefore given by: EXP1+ ~EXP2 (the "~" symbol indicates inversion), which is the ones-complement difference between EXP1 and EXP2. According to one embodiment of the present invention, a sign bit included in the ones-complement difference (typically the most significant bit) is used to indicate whether the ones-complement difference is positive. If EXP2 is equal to or greater than EXP1, the ones-complement difference will be negative and the sign bit will be set (usually indicated by a high-level logic state). If EXP2 less than EXP1, the ones-complement difference will be positive and the sign bit will be cleared (usually indicated by a low-level logic state).

According to one embodiment of the present invention, the sign bit of the ones-complement difference is used to provide respective select signals to the control inputs of four multiplexers 31, 33, 35 and 39. The multiplexer 31 selects one of the two mantissas MANT1 and MANT2, respectively included in the two floating point numbers FPN1 and FPN2, to be supplied to a data input of a shifter 41. If the sign bit of the ones-complement difference is set, the multiplexer 31 selects MANT1 to be input to the shifter 41. If the sign bit is cleared, the multiplexer 31 selects MANT2 shifted right by one bit position to be input to the shifter 41. The input of MANT2 to multiplexer 31 is indicated by a right-directed arrow 32 to indicate the right-shift of MANT2 by one bit.

The multiplexer 33 selects either MANT1 or MANT2 to be input to an adding unit 43. If the sign bit of the ones-complement difference is set, MANT2 is input to the adding unit 43. If the sign bit is cleared, MANT1 is input to the adding unit 43. By configuring the multiplexers 31 and 33 to select alternately between the two mantissas MANT1 and MANT2 for any given state of the sign bit, one of the two mantissas MANT1 and MANT2 is input to the shifter 41 and the other of the two mantissas is input directly to the adding unit 43 for each new pair of floating point numbers received at the input of the floating point adder 25.

The multiplexer 35 receives the ones-complement difference from the adding unit on a first input and an inversion of the ones-complement difference on a second input. An inverter 37 is provided to invert the ones-complement difference before it is input to the second input of the multiplexer 35. If the sign bit of the ones-complement difference is set, the inverted value of the ones-complement difference is supplied to a shift control input SC of the shifter 41. If the sign bit is cleared, the un-inverted ones-complement difference is supplied to the shift control input SC of the shifter 41.

The multiplexer 39 receives exponents EXP1 and EXP2 at respective inputs. If the sign bit of the ones-complement difference is set, EXP2 is output by the multiplexer 39 and, if the sign bit is cleared, EXP1 is output by the multiplexer 39. By this design, the exponent selected to be output by multiplexer 39 is always greater than or equal to the unselected exponent. As indicated in FIG. 2, the exponent output by the multiplexer 39 is the exponent of the floating point sum output by the floating point adder 25.

The shifter 41 receives a mantissa from the multiplexer 31 at its data input and a shift count signal from the multiplexer 35 at its shift control input SC. The shift count signal indicates the number of bits by which the input mantissa is to be shifted right. As discussed above, according to one embodiment of the present invention, the shift count signal is either the ones-complement difference between exponents EXP1 and EXP2 or an inversion of the ones-complement difference, depending on the sign of the ones-complement difference. The shifter 41 shifts the input mantissa right by the number of bits indicated by the shift count signal and then outputs the shifted mantissa to an input of the adding unit 43. The adding unit 43 adds the shifted mantissa to the unshifted mantissa received on its other input to produce a sum of mantissas. Together the sum of mantissas and the exponent output by the multiplexer 39 constitute a floating point sum of the two floating point numbers FPN1 and FPN2. Normalization of the floating point sum, if required (e.g., due to a carry in the sum of mantissas), may be performed by downstream logic (not shown). Also, bits shifted off a mantissa may be logically combined to produce a "sticky bit" which can be used in rounding operations.

From one perspective, the multiplexers 31 and 35, the inverter 37 and the shifter 41 may be viewed as shift logic that shifts a mantissa right by a number of bits based on the ones-complement difference. A negative-valued ones-complement difference indicates that EXP2 is greater than or equal to EXP1, and that MANT1 must therefore be right-shifted by an amount equal to EXP2−EXP1. In prior art circuits, an extra subtraction circuit has been provided to calculate EXP2−EXP1 (i.e., two subtraction circuits are provided: one to calculate EXP2−EXP1, and another to calculate EXP1−EXP2). However, according to one embodiment of the present invention, EXP2−EXP1 is obtained without extra subtraction circuitry by inverting the ones-complement difference between EXP1 and EXP2, that is ~(EXP1+~EXP2). The equivalence between the operations EXP2−EXP1 and ~(EXP1+~EXP2) can be appreciated by the following:

$$\sim(\text{value})=(-1\times\text{value})-1, \text{ so that}$$

$$\sim(\text{EXP1}+\sim\text{EXP2})=(-1\times(\text{EXP1}+(-1\times\text{EXP2})-1))-1=\text{EXP2}-\text{EXP1}.$$

Consequently, by inverting the ones-complement difference and supplying the result to the shift control input SC of the shifter 41, MANT1 is shifted right by the appropriate number of bits before being added to MANT2.

A positive-valued ones-complement difference means that EXP1 is greater than EXP2, and that MANT2 must therefore be right-shifted. However, because the ones-complement difference is not the mathematically true difference between EXP1 and EXP2 (it is short by one), MANT2 must be shifted right not just by the number of bits indicated by the ones-complement difference, but also by one additional bit.

Figure 3:
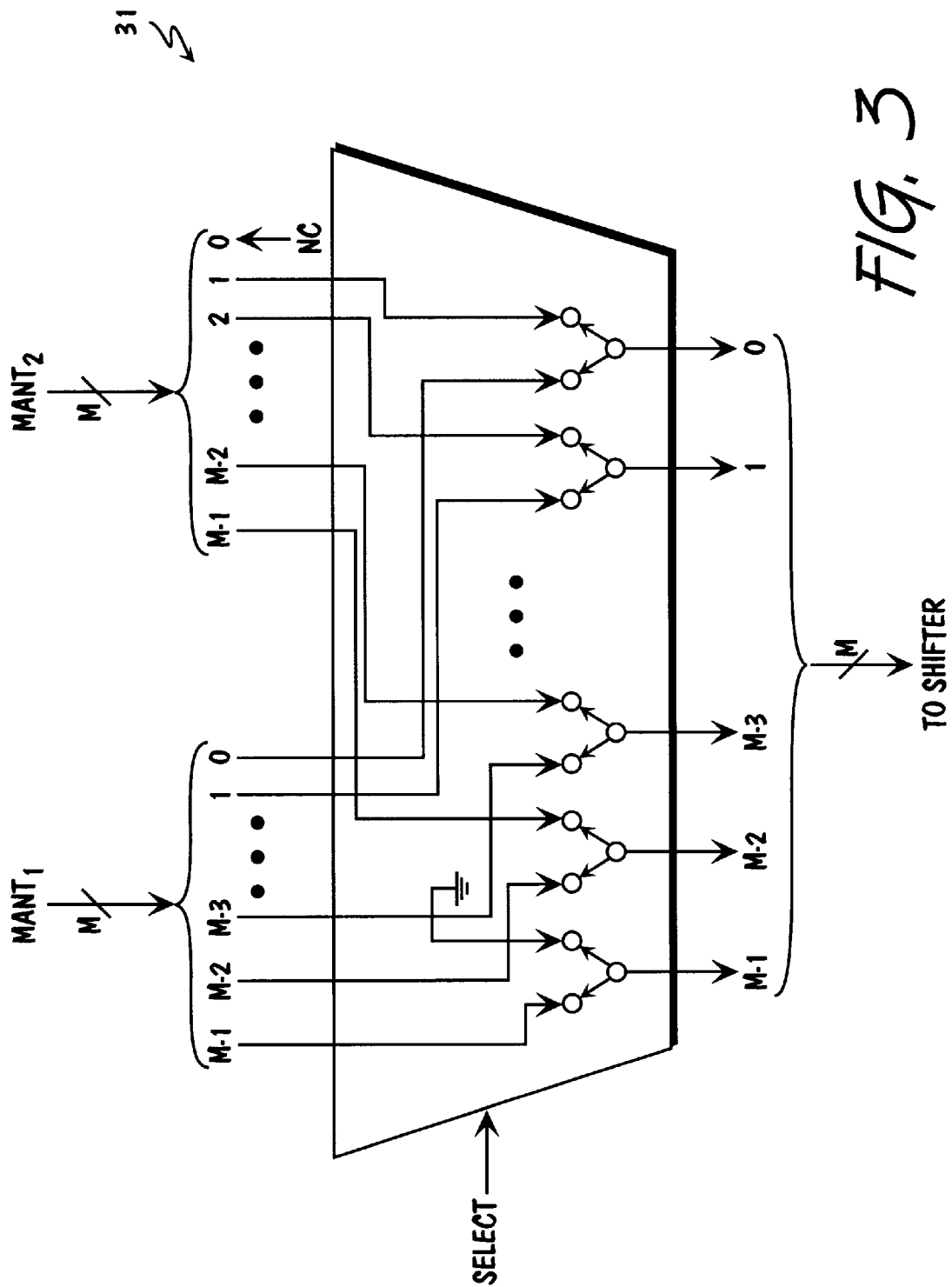
FIG. 3 is a diagram of a multiplexer that right-shifts a mantissa.

FIG. 3 illustrates an embodiment of the multiplexer 31 of FIG. 2 that can be used to provide an additional one bit right-shift of MANT2. As shown, the multiplexer has an output to the shifter (not shown), an input to receive the M bits (M−1 to 0) of mantissa MANT1 and an input to receive the most significant M−1 bits of the M bits of mantissa MANT2. As indicated in FIG. 3, the least significant bit of MANT2 is not connected to a multiplexer signal path.

When the select signal is in a first state (e.g., a high logic level), bits M−1 to 0 of mantissa MANT1 are output on signal lines M−1 to 0, respectively, of the multiplexer 31 output. When the select signal is in a second state (e.g., a logic low level), bits M−1 to 1 of MANT2 are output on signal lines M−2 to 0, respectively, of the multiplexer 31 output. The effect of this configuration is to transmit the M−1 most significant bits of MANT2 on the M−1 least significant signal lines of the multiplexer 31 output. Signal line M−1 of the multiplexer 31 output is coupled to a constant reference voltage (e.g., a ground reference as indicated in FIG. 3) when the select signal is in the second state. Consequently, when the select signal is in the second state, the value of MANT2 is passively shifted right by one bit in the multiplexer 31.

Returning to FIG. 2, the one bit right-shifted value of the mantissa MANT2 is received in the shifter 41 where it is further shifted right by the number of bits indicated by the ones-complement difference. The combination of shift operations implemented in the multiplexer 31 and the shifter 41 result in the mantissa MANT2 being shifted by a number of bits equal to EXP1–EXP2. The shifted value of MANT2 may therefore be added to the unshifted value of MANT1 in adding unit 43 to produce a sum of mantissas as discussed above.

Figure 4:
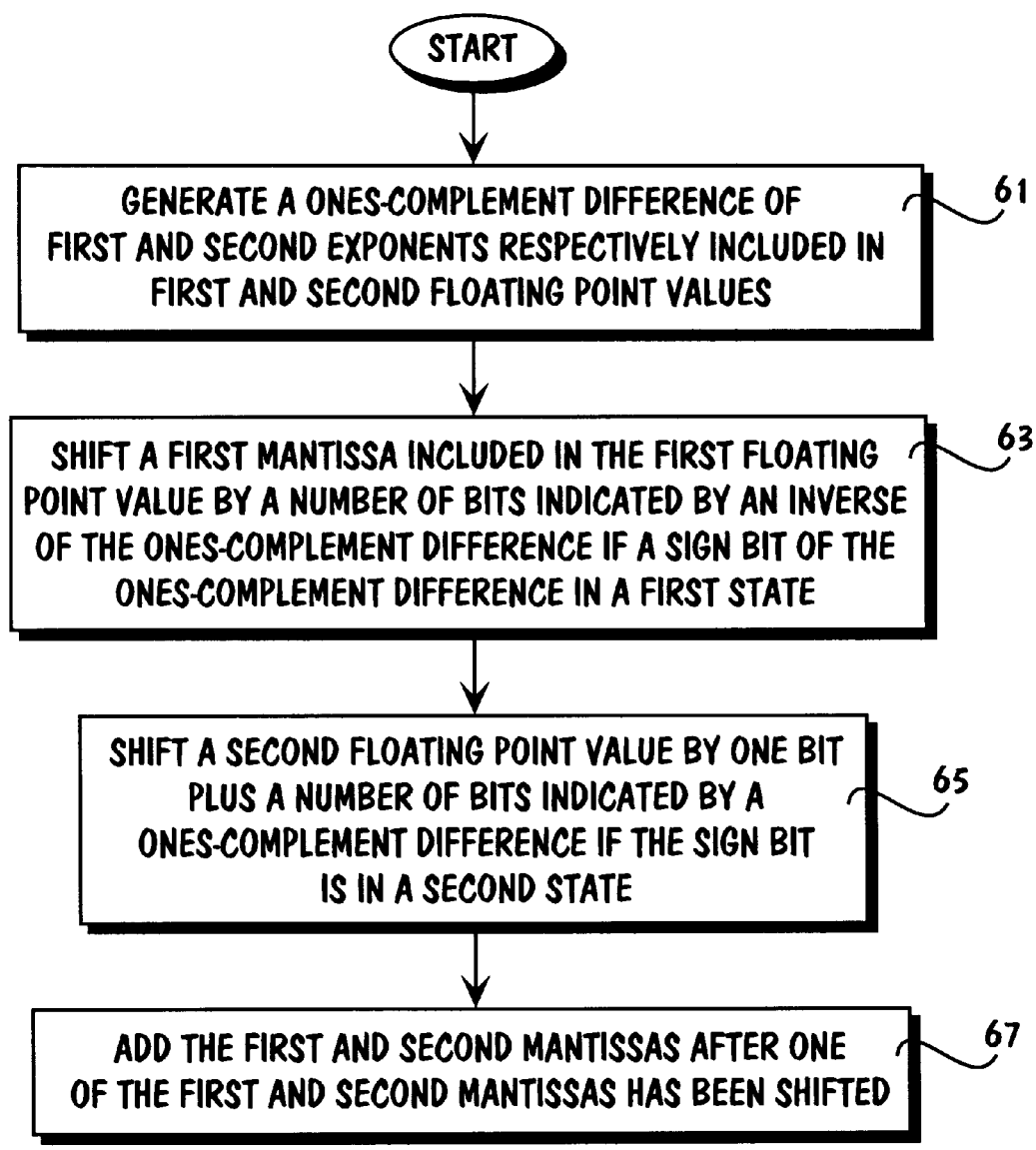
FIG. 4 is a diagram of a method according to one embodiment of the present invention.

FIG. 4 is a diagram of a method according to one embodiment of the present invention. At step 61, a ones-complement difference of first and second exponents included in respective first and second floating point values is generated. At step 63, if a sign bit of the ones-complement difference is in a first state, a first mantissa from the first floating point value is shifted by a number of bits indicated by an inverse of the ones-complement difference. At step 65, if the sign bit is in a second state, a second floating point value is shifted by one bit plus a number of bits indicated by the ones-complement difference. The first and second mantissas are added in step 67, after either the first mantissa has been shifted in step 63 or the second mantissa has been shifted in step 65.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. An apparatus comprising:
    difference logic that generates a ones-complement difference between first and second exponents respectively included in first and second floating point values;
    shift logic that generates a shifted mantissa by shifting either a first mantissa included in the first floating point value or a second mantissa included in the second floating point value depending on whether a sign bit of the ones-complement difference is in a first state or a second state; and
    a first adder to add the shifted mantissa and one of the first and second mantissas;
    wherein the shift logic includes a first multiplexer having first data input to receive the first mantissa, a second data input to receive the second mantissa, a control input to receive a select signal based on the sign bit of the ones-complement difference, and an output to output based on the select signal either the second mantissa shifted by one bit or the first mantissa.

2. The apparatus of claim 1 wherein the shift logic shifts the first mantissa by a number of bits indicated by an inverse of the ones-complement difference if the sign bit is in the first state.

3. The apparatus of claim 1 wherein the shift logic shifts the second mantissa by one bit plus a number of bits indicated by the ones-complement difference if the sign bit is in the second state.

4. The apparatus of claim 1 wherein the difference logic includes:

a first inverter that inverts the second exponent to produce an inverted exponent; and
a second adder that adds the first exponent and the inverted exponent to produce the ones-complement difference between the first and second exponents.

5. The apparatus of claim 1 wherein the output of the first multiplexer includes M signal lines ranging from most significant to least significant, and wherein, when the select signal selects the second mantissa to be output by the first multiplexer, M-1 most significant bits of the second mantissa are output on M-1 least significant signal lines of the M signal lines to shift the second mantissa by one bit.

6. The apparatus of claim 1 wherein the shift logic further includes a shifter having a data input to receive a mantissa output by the first multiplexer and a shift control input to receive a shift count signal indicating, based on the ones-complement difference, a number of bits to shift the mantissa.

7. The apparatus of claim 6 wherein the shift logic further includes a second multiplexer having a first input to receive the ones-complement difference, a second input to receive an inverse of the ones-complement difference, a control input to receive a select signal based on the sign bit of the ones-complement difference, and an output to output based on the select signal either the ones-complement difference or the inverse of the ones-complement difference to the shift control input of the shifter.

8. The apparatus of claim 1 wherein the apparatus is a processor.

9. An apparatus comprising:
    means for generating a ones-complement difference between first and second exponents respectively included in first and second floating point values;
    means for shifting either a first mantissa included in the first floating point value or a second mantissa included in the second floating point value depending on whether a sign bit of the ones-complement difference is in a first state or a second state; and
    means for adding the first and second mantissas after one of the first and second mantissas has been shifted by the shift logic;
    wherein the means for shifting includes first means for multiplexing having first data input means for receiving the first mantissa, second data input means for receiving the second mantissa, control input means for receiving a select signal based on the sign bit of the ones-complement difference, and output means for outputting based on the select signal either the second mantissa shifted by one bit or the first mantissa.

10. The apparatus of claim 9 wherein the means for shifting shifts the first mantissa by a number of bits indicated by an inverse of the ones-complement difference if the sign bit is in the first state.

11. The apparatus of claim 9 wherein the means for shifting shifts the second mantissa by one bit plus a number of bits indicated by the ones-complement difference if the sign bit is in the second state.

12. The apparatus of claim 9 wherein the means for generating a ones-complement difference includes:
    means for inverting the second exponent to produce an inverted exponent; and
    means for adding the first exponent and the inverted exponent to produce the ones-complement difference between the first and second exponents.

13. The apparatus of claim 9 wherein the output means of the first means for multiplexing includes M signal lines ranging from most significant to least significant, and wherein, when the select signal selects the second mantissa to be output by the first means for multiplexing, M-1 most significant bits of the second mantissa are output on M-1 least significant signal lines of the M signal lines.

14. The apparatus of claim 9 wherein the means for shifting further includes mantissa shifting means for receiving a mantissa output by the first means for multiplexing, and means for receiving a shift count signal indicating, based on the ones-complement difference, a number of bits to shift the mantissa.

15. The apparatus of claim 14 wherein the means for shifting further includes a second means for multiplexing, the second means for multiplexing including means for receiving the ones complement difference, means for receiving an inverse of the ones-complement difference, means for receiving a select signal based on the sign bit of the ones-complement difference, and means for outputting based on the select signal either the ones-complement difference or the inverse of the ones-complement difference to the means for receiving a shift count signal.

* * * * *